United States Patent [19]
Sohrt et al.

[11] Patent Number: 6,138,970
[45] Date of Patent: Oct. 31, 2000

[54] UNIVERSALLY ADJUSTABLE MOUNTING SYSTEM

[76] Inventors: Thomas M. Sohrt; Carrie Sohrt-McCormick, both of P.O. Box 10028, Costa Mesa, Calif. 92627

[21] Appl. No.: 09/307,323

[22] Filed: May 7, 1999

[51] Int. Cl.[7] ..................................................... E04G 3/00
[52] U.S. Cl. ........................................................ 248/278.1
[58] Field of Search ............................ 248/276.1, 278.1, 248/279.1, 274.1, 125.7, 125.8

[56] References Cited

U.S. PATENT DOCUMENTS

| | | | |
|---|---|---|---|
| 1,114,948 | 10/1914 | Walker | 108/5 |
| 1,318,703 | 10/1919 | Stuchlak | 108/5 |
| 4,905,944 | 3/1990 | Jost et al. | 248/125.8 |
| 5,011,104 | 4/1991 | Fang | 248/125.8 |
| 5,118,058 | 6/1992 | Richter | 248/278.1 |
| 5,370,570 | 12/1994 | Harris | 446/227 |
| 5,772,162 | 6/1998 | Lin | 248/125.1 X |
| 5,772,174 | 6/1998 | Hirsch et al. | 248/278.1 X |

*Primary Examiner*—Ramon O. Ramirez
*Attorney, Agent, or Firm*—James G. O'Neill

[57] ABSTRACT

A mounting system having a top or first adjustable arm and an adjustable second arm with a hollow body. An upper portion of the second arm is telescopically mounted in a lower portion of the second arm, and both the first adjustable arm and the second arm are pivotably secured together and to ball joints so as to pivotably and rotatably move a tray held on an upper end of the first arm in multiple directions.

14 Claims, 2 Drawing Sheets

UNIVERSALLY ADJUSTABLE MOUNTING SYSTEM

BACKGROUND OF THE INVENTION

1. Field of the Invention

This invention relates generally to mounting systems, and, more particularly, to a universally adjustable mounting system.

2. Description of Related Art

Mounting systems are well known for use in helping persons with various disabilities and/or needs. However, many people who use such mounting systems have difficulty or find it impossible to move or adjust such known systems. Therefore, many persons have to use more than one system, jury-rig their own system, or make do with an inadequate system that is permanently secured in place where it may not always be used. There, therefore, is a long-felt need in the art for a mounting system, which is universally adjustable, and which may be easily moved from and/or mounted on wheelchairs, walkers, hospital beds, strollers, tables, and the like.

SUMMARY OF THE INVENTION

Accordingly, it is a general object of the present invention to provide an improved adjustable mounting system. It is a particular object of the present invention to provide an improved universally adjustable mounting system, easily mounted to different shaped holding elements. It is a still more particular object of the present invention to provide an improved universally adjustable mounting system that allows a user to obtain an optimum position to support items. It is yet another particular object of the present invention to provide an improved universally adjustable mounting system that may be supported on substantially any shaped holder in any desired position. And, it is yet still another particular object of the present invention to provide an improved universally adjustable mounting system which has pivoting and telescoping elements that work together to provide the of pivoting joints, and which includes quick release connections, which are easily adaptable to be mounted on a conveyance or fixed piece of furniture.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, wherein:

DESCRIPTION OF THE PREFERRED EMBODIMENTS

Figure 1:
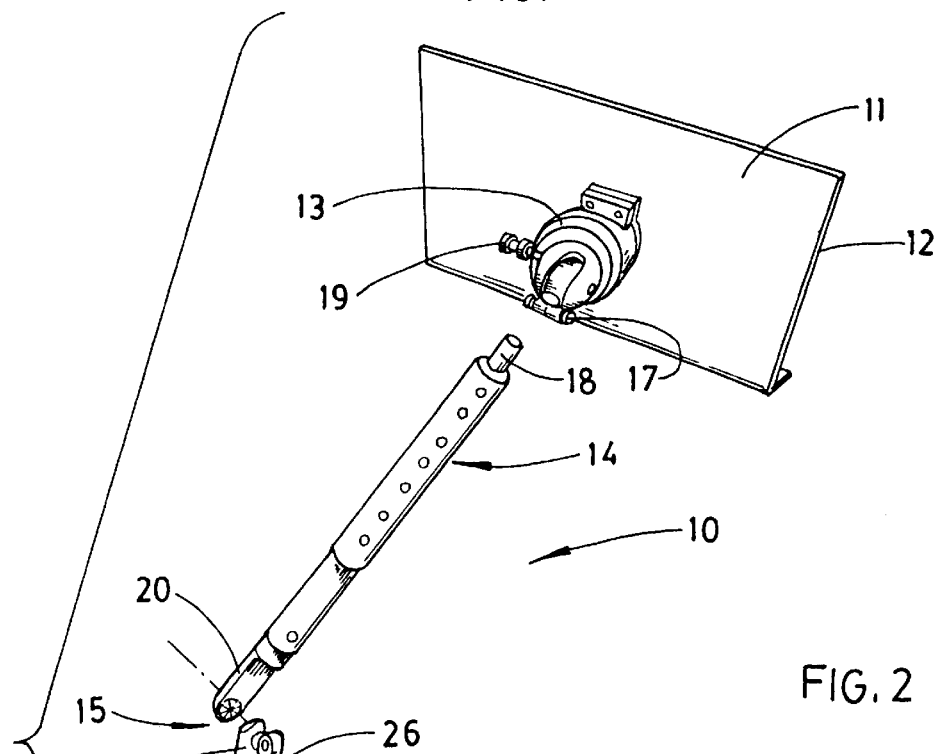
FIG. 1 is an exploded perspective view of an improved mounting system of the present invention.

The following description is provided to enable any person skilled in the art to make and use the invention and sets forth the best modes contemplated by the inventors of carrying out their invention. Various modifications, however, will remain readily apparent to those skilled in the art, since the generic principles of the present invention have been defined herein specifically to provide for an improved universally adjustable mounting system, generally indicated at 10.

The mounting system 10 comprises a top tray portion 12, adjustably secured to an elongated adjustable first or upper arm 14, which is secured, as by means of an articulated joint 15 to an elongated, adjustable, second or lower arm 16. The top tray 12 includes a rotating and pivotable ball joint 13, releasably secured to a bottom surface 11 thereof. A reduced diameter portion 18 of the upper arm 14 fits into and is held in an opening 17 formed in the ball joint 13, as by means of an adjustable securing means 19, such as a bolt.

The upper end of upper arm 14 may include an adjustable means, such as a retractable pin and a plurality of aligned holes into which the retractable pin may be held. A lower end 20 of the upper arm 14 is preferably formed with a flat surface and includes a plurality of grooves or serrations 22, which cooperate with matching grooves or serrations on a complementary upper end 24 of lower arm 16, to allow the arms 14 and 16 to be rotated with respect to each other, around joint 15. The lower end 20 and upper end 24 are releasably held together by clamping or securing means 26, passing through aligned openings in the ends 20 and 24.

Figure 3:
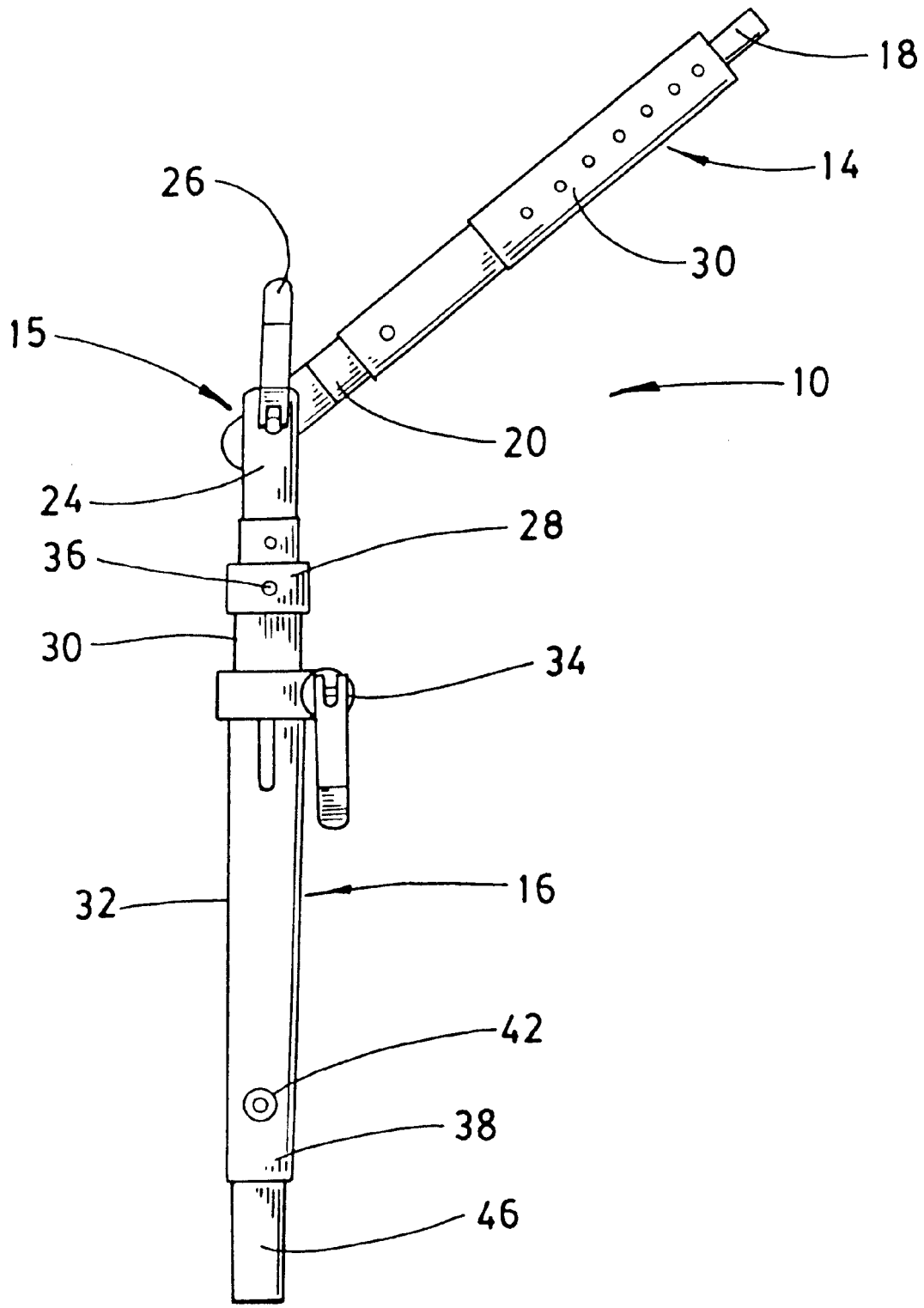
FIG. 3 is a side elevational view of arms of the mounting system of the present invention, in retracted positions.

The lower arm 16 also includes a collar 28 slidably held on a tubular portion 30. The tubular portion 30 is telescopically held in an elongated, hollow, tubular, lower portion 32. A further clamping element or means 34 adjustably holds the tubular portion 30 in the hollow, lower portion 32. The collar 28 may be slid along the tubular portion 30 and secured in position to allow a person to control the depth (length of 30) inserted into 32. A set screw 36 (see FIG. 3) is provided on collar 28, to allow the collar to be secured on 30 in any desired position.

Figure 2:
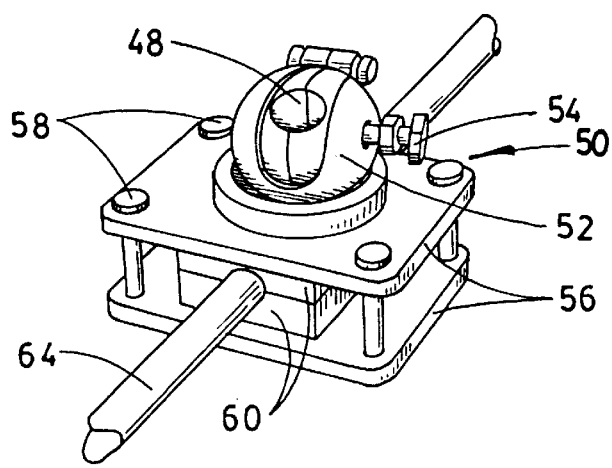
FIG. 2 is an enlarged partial perspective view of a mounting base used to clamp the mounting system of FIG. 1 to an object.

A lower end 38 of the hollow, tubular, lower portion 32 includes aligned openings 40. A releasable pin 42 is insertable through the aligned openings 40, and further aligned openings 44, formed in a reduced diameter lower element or section 46, to releasably hold the lower section 46 in lower end 38 (see FIG. 3). The lower element 46 is held in an opening 48, formed in a mounting base 50 (see FIGS. 1 and 2), having a ball joint 52 with adjustable clamping plates 56 secured together at four corners thereof by means of securing elements 58, such as nuts and bolts. The clamping plates 56 are easily attached to a rectangular holding element or bar (not shown) on a wheelchair, walker, etc. However, if the wheelchair, walker, etc. is made from tubular elements, a pair of adapter blocks 60, having semi-circular openings 62 formed therein are held between the clamping plates 56, to form a circular opening for holding a tubular element therein, such as 64 (see FIG. 2).

It, therefore, can be seen that the universal mounting system of the present invention provides a device that may be quickly and easily mounted on a wheelchair, walker, hospital bed, stroller, table, or the like, for use by a person confined therein. The mounting base of the present invention allows arms attached thereto to be turned about a circle of 360°, as well as articulated or swung away or towards the user. Furthermore, the adjustable arms and ball joints thereof allow the top tray to be adjusted at substantially any desired angle and/or height for the convenience of a user. The quick release pin 42 allows the arms and top tray to be easily removed from the mounting base for use with a further base, placed elsewhere.

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

What is claimed is:

1. A mounting system, comprising:
   an elongated, hollow body having an adjustable first arm and an adjustable second arm pivotably held together;
   a top tray secured to a reduced diameter first end of the adjustable first arm by a first pivoting means;
   the adjustable first arm having a second end with serrations thereon, adjustably secured to a serrated end of the adjustable second arm;
   the adjustable second arm being comprised of an elongated, hollow, tubular body having two telescoping, tubular members, with a first collar means and a securing means for adjusting the length of the elongated, hollow, tubular body;
   a lower end of the adjustable second arm having a reduced diameter element thereon;
   a second pivoting means releasably holding the reduced diameter element; and
   a pair of clamping plates secured to the second pivoting means.

2. The mounting system of claim 1 wherein adapter blocks are held and captured between the pair of clamping plates.

3. The mounting system of claim 2 wherein the reduced diameter element of the second arm is held on one of the two telescoping tubular members by a quick-release pin.

4. The mounting system of claim 3 wherein the first pivoting means and the second pivoting means are ball joints.

5. The mounting system of claim 1 wherein the first collar means is adjustable along one of the telescoping tubular members.

6. The mounting system of claim 5, further including a releasable pin secured in a second of the telescoping members and holding a lower tubular element therein, which lower tubular element forms the reduced diameter element.

7. The mounting system of claim 6 wherein the lower tubular element is releasably held in an opening in the second pivoting means.

8. The mounting system of claim 7 wherein the first pivoting means and the second pivoting means are ball joints.

9. A mounting system, comprising:
   a first, elongated arm;
   a second elongated, hollow, arm, comprised of a top tubular member slidingly mounted with respect to a bottom, tubular member;
   a top tray secured to a first end of the first, elongated arm away from the second, elongated, hollow arm;
   a pair of aligned openings formed in the bottom, tubular member, away from said top, tubular member;
   a pin, releasably mounted in the pair of aligned openings in the bottom, tubular member, and secured to a further, reduced-diameter, tubular element;
   a first ball joint, pivotably and rotatably carrying the first, elongated arm; and
   a second ball joint, pivotably and rotatably carrying the second, elongated, hollow arm.

10. The mounting system of claim 9 wherein the first ball joint is secured to a bottom surface of the top tray.

11. The mounting system of claim 10, further including a pair of clamping plates secured to the second ball joint.

12. The mounting system of claim 11 wherein the pair of clamping plates includes a pair of adapter blocks held therebetween.

13. The mounting system of claim 12 wherein the first ball joint is releasably secured to the bottom surface of the top tray.

14. A mounting system, comprising:
   an elongated body, comprised of an adjustable top arm and a bottom arm connected together by an articulated joint; the bottom arm having a first tubular member, telescopingly mounted in a second, tubular member;
   a top tray secured to a first end of the top arm, away from the bottom arm, by a first ball joint, releasably mounted on a bottom surface of the top tray;
   a second ball joint secured to a reduced diameter lower end of the second tubular member, away from the first tubular member;
   a pair of clamping plates mounted on the second ball joint;
   a collar slidably mounted on the first tubular member;
   adjusting means mounted between the first tubular member and the second tubular member; the adjusting means having a lever; and
   a quick release pin held in a pair of aligned openings in the lower end of the second tubular member, for releasably holding the reduced diameter lower end to the second tubular member.

* * * * *